Figure 1:
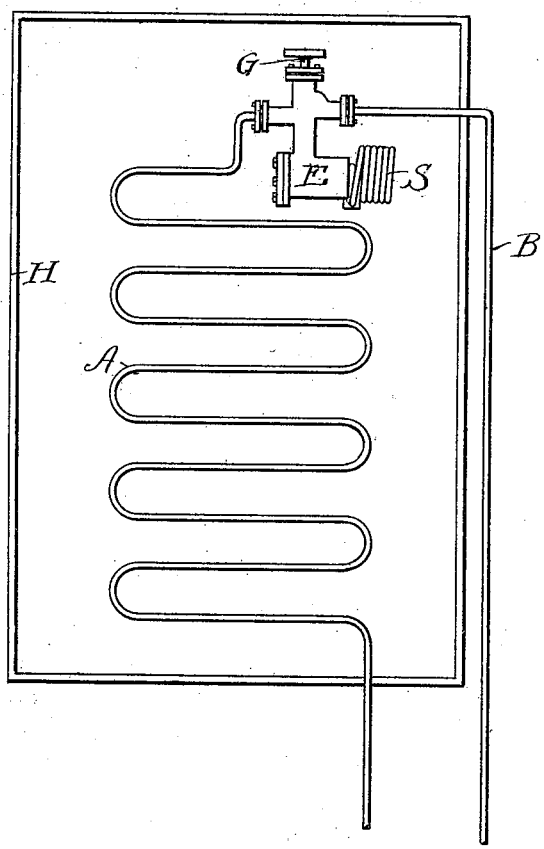

No. 712,861. Patented Nov. 4, 1902.
C. D. SWORD.
MECHANISM FOR AUTOMATIC CONTROL OF REFRIGERATION.
(Application filed Dec. 23, 1901.)

(No Model.) 2 Sheets—Sheet 1.

Witnesses.
E. B. Gilchrist
H. W. Wise

Inventor.
Charles D. Sword,
By his Attorneys,
Thurston & Bates

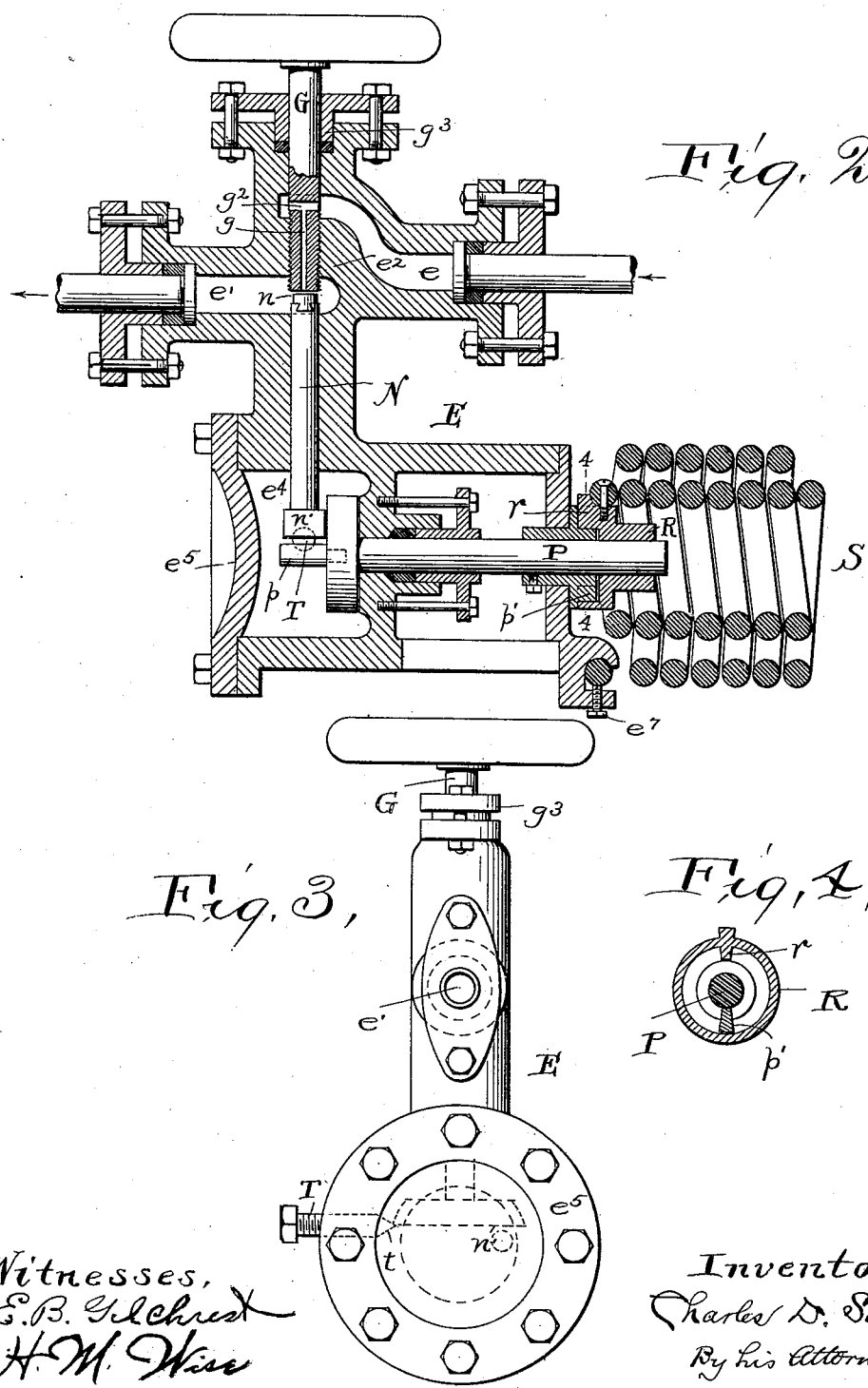

UNITED STATES PATENT OFFICE.

CHARLES D. SWORD, OF CONNEAUTVILLE, PENNSYLVANIA, ASSIGNOR TO PATRICK C. SHEEHAN, TRUSTEE, OF CONNEAUTVILLE, PENNSYLVANIA.

MECHANISM FOR AUTOMATIC CONTROL OF REFRIGERATION.

SPECIFICATION forming part of Letters Patent No. 712,861, dated November 4, 1902.

Application filed December 23, 1901. Serial No. 86,898. (No model.)

*To all whom it may concern:*

Be it known that I, CHARLES D. SWORD, a citizen of the United States, residing at Conneautville, in the county of Crawford and State of Pennsylvania, have invented a certain new and useful Improvement in Mechanism for the Automatic Control of Refrigeration, of which the following is a full, clear, and exact description, reference being had to the accompanying drawings.

This invention is an improvement in the art of artificial refrigeration, the object being to automatically maintain substantially uniform temperature in a box or compartment being artificially refrigerated.

The invention resides in a novel expansion-valve and its thermostatic operating mechanism, which valve is located between the high-pressure pipes and the expansion-coils, the thermostat being located in the compartment to be refrigerated, whereby the valve will be opened or closed, as circumstances require, to maintain the substantial uniformity of temperature desired in said compartment wholly independently of the pressure in the pipes on either or both sides of said expansion-valve, all as hereinafter clearly set forth, and definitely specified in the claims.

In the drawings, Figure 1 is a broadly-diagrammatic view of a compartment to be refrigerated, the expansion-coils therein, the expansion-valve, and its automatic operating mechanism located in said compartment in proper relation to the expansion-coils and the high-pressure pipe. Fig. 2 is a vertical sectional view of the valve and its operating mechanism. Fig. 3 is an end view thereof, and Fig. 4 is a sectional view on line 4 4 of Fg. 2.

Referring to the parts by letters, H represents the compartment whose contents—water, air, or fluid—the mechanism shown is designed to refrigerate and maintain at substantially uniform temperature. A represents the expansion-coils located in said compartment and designed to cool the same.

B represents the high-pressure pipe from which the volatile liquid—as, for example, anhydrous ammonia—is discharged into the expansion-coils through the expansion valve, which is connected in the system of circulation between the high-pressure pipe and said expansion-coils and is located in said compartment H. The inlet-port $e$ of the valve-casing E is connected with the high-pressure pipe B and the outlet-port $e'$ with the low-pressure pipe or expansion-coils A. The inlet and outlet ports are separated by a partition $e^2$, through which is a suitable opening by means of which communication is established between the opposite sides thereof. A rod G, which passes through the outer wall of the valve-casing and through a stuffing-box $g^3$, secured therein, crosses the inlet-port $e$ and screws through the partition $e^2$, projecting into the outlet-port $e'$. By means of the threaded engagement of this rod with the partition $e^2$ this valve-rod may be adjusted toward or from the coöperating seat $n$ on the opposite valve N. A passage $g$ extends longitudinally through this rod G from its inner end to a point where it is intersected by a transverse passage $g^2$, whose outer ends communicate with the inlet-port. The valve N has, preferably, a flat soft-metal seat on its upper end, and this valve is located in axial alinement with the rod G, and its opposite end or stem extends through a hole in the valve-casing into a recess $e^4$. This recess, which is closed, as by a cap $e^5$, may be filled with mineral oil or other suitable fluid, so as to seal the opening through which this valve-stem passes. On the lower end of the valve N is a cross-head $n'$, lying and operating in the recess $e^4$. A crank-pin $p$, which is secured to the inner end of a shaft P, rotatably mounted in the valve-casing and projecting into the recess $e^4$, lies beneath this cross-head and may when the shaft is turned raise it and move the valve N toward the seat on the end of the rod G, thereby restricting the size of and ultimately closing the discharge end of the passage-way in said rod G, through which the refrigerating medium must pass from the high-pressure pipe into the low-pressure pipe or expansion-coils A. This shaft P projects outside of the valve-casing, and the opening through which it so projects is also sealed by the oil in the recess $e^4$. On the projecting end of the shaft P a sleeve R is loosely mounted, this sleeve having an inwardly-projecting tooth $r$, adapted to be engaged by an outwardly-projecting tooth $p'$, secured to the shaft.

S represents a thermostat, which in the construction shown consists of a coil of wire of suitable dimensions to conform with the requirements of the apparatus. One end of this thermostatic coil is fastened to the sleeve R by means of a screw or otherwise, while the other end of said thermostatic coil is adjustably fixed to a stationary support—as, for example, the valve-case—by suitable means—as, for example, the clamping-screw $e^7$. The described parts are so arranged that as the thermostat contracts under the influence of lowering temperature it will rotate the sleeve R, which, through the engagement of the teeth $r$ and $p'$, will turn the shaft P in that direction which will cause the crank-pin $p$ to engage with the cross-head $n'$ and lift the valve N, thereby carrying its seat $n$ toward and into contact with the seat on the lower end of the rod G, thereby closing the passage $g$. An adjustable stop T is provided for limiting the possible downward movement of the valve N from the end of the rod G. In the form shown this is a screw or thread having a tapered end $t$ passing beneath the cross end $n'$. By screwing this device in the possible downward movement of the valve N is restricted.

In applying this valve to any refrigerating apparatus it is necessary to adjust the positions of the rod G and this adjustable stop T relative to the valve N so that the maximum flow of the fluid through the passage-way $g$ when the valve N is moved down to its limit shall be proportionate to the capacity of the pump or other mechanism forcing the fluid through the high-pressure pipe. These adjustments being made, the thermostatic coil is connected with the valve-casing at the proper point in its length, so that when the temperature in the compartment is at the desired low temperature the length of the thermostatic coil will have been sufficiently reduced to effect, through the described intermediate mechanism, to a practical closure of the valve—that is to say, of the discharge end of the passage $g$. When the adjustments above referred to are effected, the operation of the valve by its thermostat is entirely automatic and entirely independent of the pressure or relations between the pressures on the high and low pressure sides thereof.

The mode of operation is substantially as follows: When the temperature of the atmosphere in the compartment being cooled has very nearly reached the proper temperature, the valve-rod N begins its movement toward the valve-seat, thereby restricting the flow of the refrigerating medium into the expansion-coils. The pump continues its operation, and therefore a greater degree of vacuum is produced in said expansion-coils, thereby rapidly cooling the pipes, especially near the valve-casing. This quickly cools the surrounding atmosphere, and the effect of this local cooling is felt by the thermostat, which thereupon contracts more rapidly, having the immediate final effect on the valve of entirely closing the same. This local cooling near the valve, before referred to, is ultimately distributed by the circulation of the air within the compartment. The resulting temperature of said air is substantially that which it is desired to maintain. The flow of the refrigerant being entirely shut off, as explained, the temperature of the air or fluid in the compartment will very soon begin slowly to rise. When it rises above the desired temperature, the thermostat expands and permits the opening of the valve, with the result that the liquid-refrigerating medium passes the valve and is vaporized, thereby reducing the temperature of the pipes and of the surrounding air or fluid. The described action of these parts repeats as often as is necessary to maintain the substantial uniformity of temperature in the compartment, the action of the described mechanism being automatic and wholly independent of differences in the pressure on opposite sides of the valve.

The particular thermostat employed and its connection with the operating mechanism of the valve is especially suitable for this apparatus, for if when the valve is closed there is further contraction of the thermostatic coil it results only in putting the coil under greater tension without injuring any part of the mechanism; so the expansion of the thermostatic coil has no positive effect upon the movement of the valve. It simply allows it to open, and therefore, although the thermostat may expand very much, it has no injurious effect upon the described mechanism.

Having described my invention, I claim—

1. In a refrigerating apparatus, a valve-casing containing an inlet and an outlet port separated by a partition, a rod adjustable through said partition and containing a passage-way connecting said two ports, a movable valve-rod adapted to close the end of said passage-way, a rotatable shaft, a thermostatic coil operatively connected at one end to said shaft and at the other end to a stationary support, and mechanism whereby the shaft in turning operates said valve-rod, substantially as specified.

2. In a refrigerating apparatus, a valve-casing containing an inlet and an outlet port separated by a partition, a rod adjustable through said partition and containing a passage-way connecting said two ports, a movable valve-rod adapted to close the end of said passage-way, a rotatable shaft, mechanism whereby the turning of the shaft operates the valve-rod, a collar loosely mounted upon the shaft having a tooth adapted to engage with a tooth fixed to the shaft, and a thermostatic coil connected at one end with said collar and adjustably connected at the other end to a fixed support, substantially as specified.

3. In a refrigerating apparatus, a valve-casing, containing an inlet and an outlet port separated by a partition, a rod adjustable through said partition and containing a passage-way connecting said two ports, a movable valve-rod adapted to close the end of said passage-way, a cross-head on the end of said valve-rod, a rotatable shaft, a crank-pin secured thereto and adapted to engage with said cross-head, a thermostatic coil operatively connected at one end with said shaft and at the other end to a fixed support, substantially as specified.

4. In a refrigerating apparatus, a valve-casing containing an inlet and an outlet port separated by a partition, a rod adjustable through said partition and containing a passage-way connecting said two ports, a movable valve-rod adapted to close the end of said passage-way, said casing containing a recess into which the rear end of said valve-rod projects, a shaft rotatably mounted in the valve-casing and having one end projecting into the same recess, a sealing fluid in said recess, a thermostat operatively connected with said shaft and adapted to turn the same, and mechanism whereby the turning of said shaft operates the valve-rod, substantially as specified.

In testimony whereof I hereunto affix my signature in the presence of two witnesses.

CHARLES D. SWORD.

Witnesses:
H. T. WESTON,
E. C. McKAY.